Apr. 3, 1923.
C. D. MORTON
1,450,560
SEPARATION AND FILTER SYSTEM AND APPARATUS
Filed Apr. 15, 1920
2 sheets-sheet 1
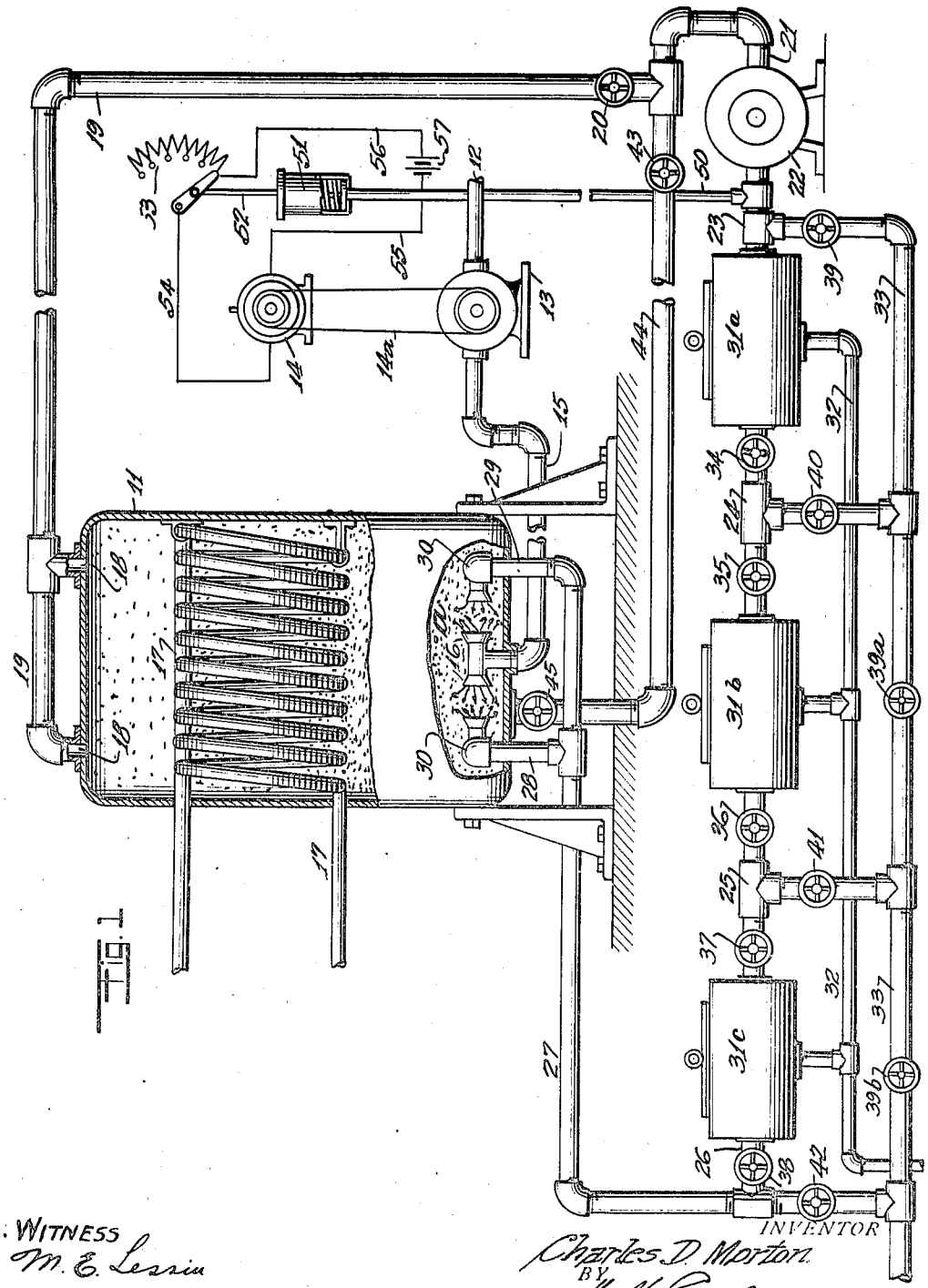
WITNESS
M. E. Lessin
INVENTOR
Charles D. Morton
BY
M. H. Loughridge
ATTORNEY

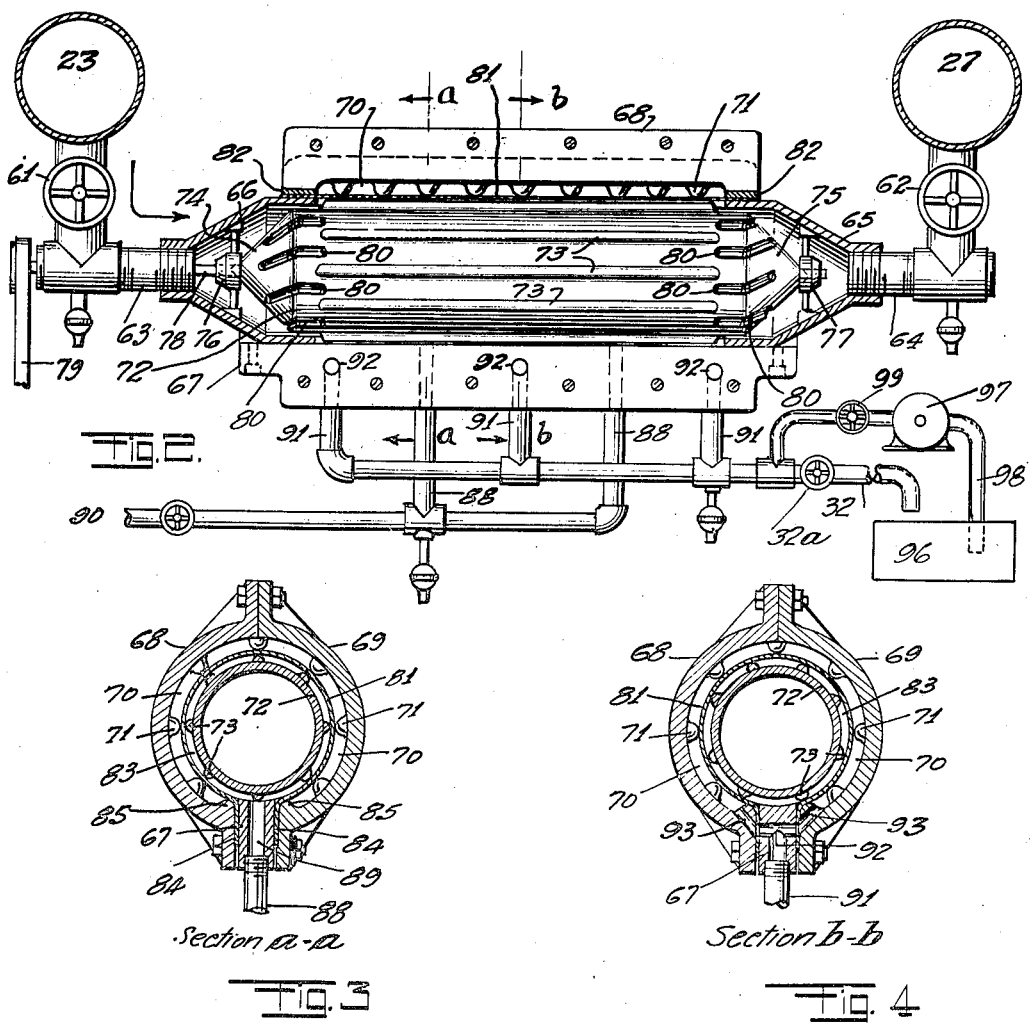

Patented Apr. 3, 1923.

1,450,560

UNITED STATES PATENT OFFICE.

CHARLES D. MORTON, OF NEW YORK, N. Y., ASSIGNOR TO MORTON FILTER PROCESS CO., OF NEW YORK, N. Y., A CORPORATION OF DELAWARE.

SEPARATION AND FILTER SYSTEM AND APPARATUS.

Application filed April 15, 1920. Serial No. 374,157.

*To all whom it may concern:*

Be it known that I, CHARLES D. MORTON, a citizen of the United States, and resident of New York, in the county of New York and State of New York, have invented certain new and useful Improvements in Separation and Filter Systems and Apparatus, of which the following is a specification.

This invention relates to methods of and apparatus for treating liquids to defecate, clarify or decolorize them. It may be used to treat sugar cane juices, melted raw sugars, syrups of sucrose, maltose and dextrose, and other liquids of various origins. The invention offers particular advantages in connection with such treatment of sugar cane juice, and I shall describe it as practised in the treatment of such juice.

The fundamental purpose of the invention is to secure the admixture with the juice, of amorphous carbon or any similar or equivalent absorptive reagent capable of absorbing color and impurities from the juice, and then to remove the reagent with the absorbed impurities by a characteristically rapid filtering operation performed without the attendant formation of any filter cake. Subsidiary features are the repeated reuse of the reagent upon progressive additions of juice until the reagent is completely saturated or spent and continual agitation of the mixture to incorporate the progressive additions of juice and maintain the solid reagent in suspension.

The process is made possible on a commercial scale by a special type of self clearing filter, which because of its self clearing function is capable of substantially continuous operation. The filter is characterized by a relatively high velocity flow of material to be filtered in a thin stream across the filter surface, the velocity of flow being sufficient to sweep the carbon particles across the filter surface so forcefully that they are not drawn against the filter cloth by the off-flowing filtrate with sufficient pressure to cause them to deposit in a mass or cake. Since no cake forms the rate of filtration is high and is maintained.

The clearing of the filter surface is preferably assisted by mechanical agitation of the mixture as it flows over the filter surface. This is not absolutely essential.

Liquid to be treated is fed to a tank or container in which the liquid to be separated is intimately mixed with an absorbent such as amorphous carbon without, however, using any mechanical means in the tank for this purpose. This absorbent and liquid are drawn off with the former in suspension and are further mechanically mixed by a circulating system which forces this liquor through one or more filter heads, and returns the unfiltered liquor to the tank. A pressure feed system may be provided and automatically regulated to supply fresh liquor to replace the filtered liquor discharged from the filter heads.

The filter head is of a novel type in which the flow of unfiltered liquor in the circulation system prevents the accumulation of cake on the filter surface. The liquor is spread out into a thin sheet and forced by hydrostatic pressure and by centrifugal forces set up by a rotary element forming part of the filter head against the filter element or surface. The filter element is readily replaceable on any filter head without disturbing the operation of other filter heads connected to the same system and this element is replaceable simply by removing the cover and without disturbing the piping connections. The construction of the filter head permits pressure to be applied to either side of the filter element as desired. The reversely acting pressure is used for cleaning purposes and when used in combination with the circulating system it is possible to clean the filter element without opening the filter head. This is desirable at relatively long intervals to clear the filter element of gums and pectins, which tend to accumulate irrespective of the formation of any filter cake. It is also useful to remove any incipient cake such as might be formed by faulty operation, for example operation at high pressure and low rate of circulatory flow.

I shall now describe a practical embodiment of the invention illustrated in the accompanying drawings, in which:—

Fig. 1 is a general layout of the system, largely in diagram.

Fig. 2 is a longitudinal section of a filter head, constructed according to my invention, certain internal parts being shown in elevation.

Fig. 3 is a transverse section on the line *a—a* of Fig. 2.

Fig. 4 is a transverse section on the line b—b of Fig. 2.

Referring to the drawings, 11 represents the tank supported on a suitable foundation, 12 is the intake of the fresh liquid which is fed through pump 13 driven by motor 14 through belt 14ª. Pump 13 is connected by pipe 15 to the discharge nozzle 16 inside and preferably near the bottom of the tank. The nozzles have flared openings to distribute the liquid as indicated by the arrows. The tank is partially filled with an absorptive agent such as carbon or kieselguhr indicated by $a$ and the incoming liquid discharged from nozzle 16 tends to keep this medium from settling on the bottom of the tank and to keep it in intimate mixture with the liquid. Many kinds of liquids require the application of heat to carry through certain processes and for this purpose the heating coils 17 may be inclosed within the tank and live steam circulated through these coils; however, the liquor may be heated by electric heaters or other means as convenient. I contemplate the use of any means known in the art to maintain temperatures suited to the particular treatment in progress. The constant circulation of the liquid permits this heating means to be localized as shown, and yet to operate to heat the entire liquid undergoing treatment.

The liquor is discharged from the tank through the openings 18 to pipe 19 which connects through valve 20 with pipe 21 leading to the circulating pump 22. From this pump the liquor is forced through pipe 23 through filter head 31ª to pipe 24 and through filter head 31 to pipe 25 and through filter head 31ᶜ to pipe 27 which by connections 28 and 29 discharges the liquid, except such as passes off as filtrate into the tank again from nozzles 30. These nozzles are located adjacent nozzle 16 as shown with the object of keeping the absorptive medium in suspension. The filtrate is drawn off from the filter heads by pipe 32 as will be more particularly described in connection with the details of the filter heads.

Any of the filter heads may be by-passed by means of pipe 33 and the valve arrangement shown; closing valve 34 and opening valves 39 and 40 will by-pass the first head; the second head can be by-passed by closing valves 35 and 36 and opening valves 39ª, 40 and 41; the third head is by-passed when valves 26 and 37 are closed and valves 39ᵇ, 41 and 42 are opened. All of the filter heads may be by-passed by opening the valves on pipes 33 and 27 and closing the valves to the heads; this is an important feature of the invention as it enables the circulation system to operate independently of the filter heads for the purpose of agitating the liquid in the tank and obtaining a thorough mixture of the liquor. Attention is called to the fact that the pump 22 aids in mechanically mixing the liquor passing through it. For the purpose of washing out the tank, pipe 44 is provided connecting through valve 45 with the bottom of the tank and connecting to pipe 21; when the valves on pipe 44 are opened the circulating pump may be used to circulate water drawn from the bottom of the tank and by-passed to the discharge.

Motor 14 is operated from battery 57 by wires 55 and 56, rheostat 53 and wire 54, the rheostat being provided as a means of regulating the speed of the motor and thus regulating the rate of feed through pump 13. This rheostat is operated by connection 52 from a spring controlled piston in cylinder 51 connected by pipe 50 to pipe 23 leading from circulating pump 22. As the circulating pump raises the pressure in pipe 23 the rheostat is operated to reduce the speed of motor 14 thus reducing the feed.

The filter heads operate by pressure maintained by the circulating pump and the quantity of liquid passed through the filter element varies according to the pressure acting thereon. This pressure may be regulated by adjusting the valves leading from the filter heads to create a back pressure against the circulating system and it may be regulated by varying the speed of the circulation pump. I contemplate the use of these means singly or in combination to produce the desired regulation. It is quite apparent that to maintain the system in continuous operation it is necessary that the feed supply fresh liquid at the same rate that the filters discharge it. As the filtrate discharge rate varies with the pressure in pipe 23 created by the circulating pump and this pressure regulates the speed of the feed pump, the feed can be made proportional to the discharge of filtrate.

The arrangement shown in Fig. 1 contemplates a sealed tank with fresh liquid supplied under pressure and a circulating pump to cause a circulation of this liquid through the system while under pressure; the former pressure may be comparatively low and, in fact, an open tank may be used into which fresh liquid is poured from a regulating valve and the feed pump dispensed with altogether. The pressure required in the circulating system depends upon the density of the liquid to be filtered and the desired rate of flow of the filtered liquid. As a general rule, if the pressure in the system is increased the minimum rate of circulatory flow which will preclude the formation of a cake in the filter head is correspondingly higher. It is commonly possible to make the rate of circulatory flow high enough to preclude the formation of cake at any pressure used in the system.

The filter head as shown in Fig. 2 is connected between the headers 23 and 27. A number of these units may be connected up in multiple to form a manifold and each one may be independently brought into use or taken out of service by means of valves 61 and 62 (see Fig. 2). The head consists of a reducing coupling 66 connecting to pipe 63 leading to header 23 and reducing coupling 65 connecting to pipe 64 leading to header 27, these couplings are connected by the separating plate 67. The filter cloth 81 is wrapped around couplings 65 and 66 with the sides terminating against plate 67 as shown and is tightly clamped in position by the split casing 68 and 69. This casing is made to seal the filter cloth against the couplings and the plate 67.

Pads 82 may be used between the filter cloth and the casing as shown to obtain a better sealing effect.

An annular space 70 is provided between the casing and the filter element or cloth 81, and a series of spaced bosses 71 formed in the casing project across this space to act as a support for the filter cloth. In order to hold the cloth to the contour of the couplings, the ridges 85 are provided on each side of the casing engaging plate 67. The casing may be secured in position by clamping bolts or other suitable means and is readily removable for the purpose of removing the filter cloth.

A drum 72 is provided in the interior of the filter head, preferably provided with conical ends 74 and 75. This drum may be mounted for rotation in the bearings 76 and 77 secured to the reducing couplings and a driving shaft 78 may extend from this drum through a stuffing box in pipe 63 to a pulley driven by belt 79. This enables the drum to be rotated mechanically if the nature of the liquid should make this desirable or it enables an index to be attached to the drum to show that it is rotating. The drum is provided with a series of ridges or corrugations 73 which pass quite close to the filter cloth. The ends of the drum are provided with grooves 80 placed spirally on the cones 74 and 75 and terminating between the ridges 73. When the liquid is forced through pipe 63 in the direction indicated by the arrow it strikes the cone 74 and through the grooves 80 enters the space between the ridges 73 indicated by 83, Figs. 3 and 4. The flow of the liquid acting on the spiral grooves causes the drum to revolve and the centrifugal action set up thereby causes the film of liquid in space 83 to be forced against the filter cloth 81. This is additional to the force it may receive from the pressure of the circulating system.

Independent connections are made to the inside and to the outside of the filter cloth through plate 67, these connections are thus a fixture with this plate and do not have to be removed when the filter cloth is changed.

As best shown in Fig. 3 pipe 88, which is connected to plate 67, communicates with a passage 89 leading to space 83 inside the filter cloth 81. As shown in Fig. 2 pipe 88 is connected to pipe 90. As shown in Fig. 4, pipe 91 connects by passage 92 and passages 93 with space 70 on the outside of the filter cloth. Pipes 91 lead off by connection 32 to tank 96. Drip cocks may be provided where necessary for testing purposes.

In filtering, it is well known that a cake tends to form on the filtering surface under pressure, and this cake, if not removed, will rapidly build up on this surface and retard filtering to such an extent that continued operation is impracticable. A vital characteristic of the present invention is the prevention of the formation of such a cake by the continuous flow of the liquid through the narrow channels 83 acting to clean the filter surface and by the agitating action of the ridges 73 as the drum is rotated also continuously cleaning the filter surface.

Even though no cake, as such, forms, the meshes of the cloth will ultimately become clogged by gums, pectins and other slimy or colloidal substances which tend to follow the filtrate. These may be washed out by reversing the flow through the cloth. To do this the valves 61 and 62 are closed and a steam jet or water pressure is applied through pipe 32 which communicates with the space 70 outside of the surface. These cleaning agents pass through the cloth to the inside. The substances cleaned off may be removed by the circulating system or through pipe 88. This process of washing may also be reversed by applying the steam to pipe 88. The circular formation of the filter cloth tends to close the pores on the inside and open them on the outside of the cloth thereby facilitating washing by pressure from the outside.

A similar result may be had, without interrupting the circulation through the tank and filter head, by temporarily applying through pipe 32 a pressure greater than that existing in the circulating system. To do this, valve 32ª is closed, valve 99 is opened and pump 97 is operated to draw filtrate from tank 96 through pipe 98 and force it into the space 70 through pipe 91 and ports 92. This is occasionally a desirable expedient where the cloth has become slightly blinded by gummy deposits, and a complete shut down is still unnecessary. It is inferior to the complete washing out of those gums through discharge pipe 88, because the gums are taken up by the circulating juice and since they increase its gummy content they cause an increased tendency to blind the cloth, When a new filter cloth is applied it may be seasoned in a few seconds by operating the circulating system at a high circulatory rate and at low pressure. The effect of the rapid flow of material across the cloth under low pressure is to fill the fiber of the cloth without forcing solid particles through it. Thus even the initial filtrate is clean and free of carbon particles. This novel effect is characteristic of this type of filter, is an obvious advantage and is believed to be due to the high velocity flow over the filter cloth. Apparently the carbon particles are swept across the cloth so rapidly they glance from the surface of the cloth and follow the circulating liquid in preference to following the filtrate through the cloth.

In the practise of my method by use of the apparatus above disclosed, the system being charged with a mixture of liquid and the finely divided solid reagent, circulation from the tank through the filter heads and back to the tank is started. During such circulation heat may be used in the tank and the rotors of the filter heads may be driven to accomplish the purposes above described.

The initial circulation, where new cloths are in use, is without substantial hydrostatic pressure in the filter cloths, but after a few minutes of this circulation the mechanism is manipulated to bring pressure upon the circulating liquid passing through the filter heads and the normal filtering operation starts. As the filtrate flows away fresh liquid is added to that in circulation at a commensurate rate, and the process continues until the reagent is spent.

The liquid is circulated with the solid reagent in suspension in it, so that there is a long average period of contact of the liquid with the reagent. The circulation maintains the reagent in suspension and prevents the formation of a filter cake, with the results that continuous operation over long periods is possible and the maximum effective use is made of the reagent.

Having thus described my invention, I claim:

1. The method of treating liquids which consists in producing an intimate mixture of such liquid with an absorptive agent in finely divided form, passing such mixture repeatedly across a filtering medium at velocity sufficient to retain said absorptive agent in suspension and prevent its deposition in substantial quantity on said filtering medium, while allowing clear filtrate to pass through such medium, and progressively adding to the mixture fresh liquid to be treated, at a rate commensurate with the off-flow of filtrate.

2. The method of treating liquids which consists in producing an intimate mixture of such liquid with an absorptive agent in finely divided form, passing such mixture repeatedly across a filtering medium at velocity sufficient to retain said absorptive agent in suspension and prevent its deposition in substantial quantity on said filtering medium, while allowing clear filtrate to pass through such medium, and progressively adding to the mixture at a point remote from said filtering medium fresh liquid to be treated, at a rate commensurate with the off-flow of filtrate.

3. The method of treating liquids which consists in producing an intimate mixture of such liquid with an absorptive agent in finely divided form, passing such mixture repeatedly across a filtering medium at velocity sufficient to retain said absorptive agent in suspension and prevent its deposition in substantial quantity on said filtering medium, while allowing clear filtrate to pass through such medium, progressively adding to the mixture at a point remote from said filtering medium fresh liquid to be treated, at a rate commensurate with the off-flow of filtrate, and heating the liquid near the point at which such additional liquid is fed to the mixture.

4. The method of treating liquids which consists in producing an intimate mixture of such liquid with an absorptive agent in finely divided form passing such mixture repeatedly across a filtering surface at velocity sufficient to tend to retain said absorptive agent in suspension and prevent its deposition in substantial quantity on said filtering medium, while allowing clear filtrate to pass through each medium, locally agitating the mixture by mechanical means as it flows across said filtering medium, and progressively adding to the mixture fresh liquid to be treated at a rate commensurate with the off-flow of filtrate.

5. In a liquid treating system, the combination of a tank; a filter; a circulating system including feed and return passages between said tank and filter, both on the same side of the filtering element thereof; a finely divided solid reagent in said tank, filter and circulating system, adapted to be suspended in and to react upon liquid undergoing treatment therein; a pump serving to circulate said liquid between said tank and filter at a rate sufficient to retain, substantially all said finely divided solid in suspension; and means serving to receive filtrate passing through the filtering element of said filter.

6. In a liquid treating system, the combination of a tank; a filter; a circulating system including feed and return passages between said tank and filter, both on the same side of the filtering element thereof; a finely divided solid reagent in said tank, filter and circulating system, adapted to be suspended in and to react upon liquid undergoing treatment therein, a pump serving to circulate said liquid between said tank and filter at a rate sufficient to retain substantially all said finely divided solid in suspension; means serving to subject the liquid in said tank, filter and circulating system to pressure; and means serving to receive filtrate passing through the filtering element of said filter.

7. In a liquid treating system, the combination of a tank; a filter, a circulating system including feed and return passages between said tank and filter, both on the same side of the filtering element thereof; a finely divided solid reagent in said tank, filter and circulating system, adapted to be suspended in and to react upon liquid undergoing treatment therein, a pump serving to circulate said liquid between said tank and filter at a rate sufficient to retain substantially all said finely divided solid in suspension; means serving to subject the liquid to pressure as it circulates through said filter between said feed and return passages; and means serving to receive filtrate passing through the filtering element of said filter.

8. In a liquid treating system, the combination of a tank; a filter; a circulating system including feed and return passages between said tank and filter, both on the same side of the filtering element thereof; a finely divided solid reagent in said tank, filter and circulating system, adapted to be suspended in and to react upon liquid undergoing treatment therein, a pump serving to circulate said liquid between said tank and filter at a rate sufficient to retain substantially all said finely divided solid in suspension; means serving to receive filtrate passing through the filtering element of said filter; and means for feeding liquid to be treated at a rate commensurate with the off-flow of filtrate.

9. In a liquid treating system, the combination of a tank; a filter; a circulating system including feed and return passages between said tank and filter, both on the same side of the filtering element thereof; a finely divided solid mixture in said tank, filter and circulating system, adapted to be suspended in and to react upon liquid undergoing treatment therein; a pump serving to circulate said liquid between said tank and filter at a rate sufficient to retain substantially all said finely divided solid in suspension; means serving to receive filtrate passing through the filtering element of said filter; means for feeding liquid to be treated at a rate commensurate with the off-flow of filtrate; and a heating unit associated with said tank.

10. In a liquid treating system, the combination of a tank; a filter; a circulating system including feed and return passages between said tank and said filter, both on the same side of the filtering element thereof; a finely divided solid reagent in said tank, filter and circulating system adapted to be suspended in and to react upon liquid undergoing treatment therein; a pump connected in said feed passage and serving to circulate said liquid between said tank and filter at a rate sufficient to retain substantially all said finely divided solid in suspension; a restriction serving to throttle the flow through said return passage to cause said pump to create hydrostatic pressure in said filter; and means serving to receive filtrate passing through the filtering element of said filter.

11. In a liquid treating system, the combination of a tank; a filter; a circulating system including feed and return passages between said tank and said filter, both on the same side of the filtering element thereof; a finely divided solid reagent in said tank, filter and circulating system adapted to be suspended in and to react upon liquid undergoing treatment therein; a pump connected in said feed passage and serving to circulate said liquid between said tank and filter at a rate sufficient to retain substantially all said finely divided solid in suspension; a manually adjustable valve serving to throttle the flow through said return passage to cause said pump to create hydrostatic pressure in said filter; and means serving to receive filtrate passing through the filtering element of said filter.

12. In a liquid treating system, the combination of a closed tank; a filter; a circulating system including feed and return passages between said tank and said filter, both on the same side of the filtering element thereof; a finely divided solid reagent in said tank, filter and circulating system adapted to be suspended in and to react upon liquid undergoing treatment therein; a pump connected in said feed passage, and serving to circulate said liquid between said tank and filter at a rate sufficient to retain substantially all said finely divided solid in suspension; means serving to receive filtrate passing through the filtering element of said filter; means for forcing liquid into said tank; and a regulator subject to the pressure in said circulating system and serving to control said liquid forcing means to maintain said pressure constant.

13. In a liquid treating system, the combination of a tank; a filter; a circulating system including feed and return passages between said tank and filter both on the same side of the filtering element thereof; a finely divided solid reagent in said tank, filter and circulating system adapted to be suspended in and to react upon liquid undergoing treatment therein, a pump serving to circulate said liquid between said tank and filter at a rate sufficient to retain substantially all said finely divided solid in suspension; a mechanical agitator serving to agitate said liquid in proximity to the surface of said filtering element; and means serving to receive filtrate passing through the filtering element of said filter.

14. In a liquid treating system, the combination of a tank, a filter, a circulating system including feed and return passages between said tank and filter, both on the same side of the filtering element thereof; a finely divided solid reagent in said tank, filter and circulating system, adapted to be suspended in and to react upon liquid undergoing treatment therein; a pump serving to circulate said liquid between said tank and filter at a rate sufficient to retain substantially all said finely divided solid in suspension; a mechanical agitator serving to agitate said liquid in proximity to the surface of said filtering element; means serving to subject the liquid in said tank, filter and circulating system to pressure; and means serving to receive filtrate passing through the filtering element of said filter.

15. In a liquid treating system, the combination of a tank; a filter; a circulating system including feed and return passages between said tank and filter, both on the same side of the filtering element thereof; a finely divided solid reagent mixture in said tank, filter and circulating system, adapted to be suspended in and to react upon liquid undergoing treatment therein; a pump serving to circulate said liquid between said tank and filter at a rate sufficient to retain substantially all said finely divided solid in suspension; a mechanical agitator serving to agitate said liquid in proximity to the surface of said filtering element; means serving to receive filtrate passing through the filtering element of said filter; and means for feeding liquid to be treated to said fluid mixture at a rate commensurate with the off-flow of filtrate.

16. In a liquid treating system, the combination of a tank; a filter; a circulating system including feed and return passages between said tank and said filter, both on the same side of the filtering element thereof; a finely divided solid reagent in said tank, filter and circulating system, adapted to be suspended in and to react upon liquid undergoing treatment therein; a pump connected in said feed passage and serving to circulate said liquid between said tank and filter at a rate sufficient to retain substantially all said finely divided solid in suspension; a mechanical agitator serving to agitate said liquid in proximity to the surface of said filtering element; a restriction serving to throttle the flow through said return passage to cause said pump to create hydrostatic pressure in said filter; and means serving to receive filtrate passing through the filtering element of said filter.

17. In a filter, the combination of a casing, an annular filtering element mounted therein, an inlet and a discharge connection for circulating fluid to be treated through the interior of said filtering element; a rotary drum mounted within said filter element in close proximity to the interior surface thereof and serving to confine the flow of fluid between the inlet and discharge connection to a stream following said surface; and means for rotating said drum.

18. In a filter, the combination of a casing; an annular filtering element mounted therein; inlet and discharge connections for circulating fluid to be treated through the interior of said filtering element; a rotary drum mounted within said filter element, having a serrated periphery in close proximity to the interior surface thereof and serving to confine the flow of fluid between the inlet and discharge connection to a stream following said surface; and means for rotating said drum.

19. In a filter head, the combination of spaced end housings one having a feed and the other a return connection for fluid to be treated; a manifold extending between said connections and provided with filtrate discharge ports; a curved filtering element overlying at its edges said end housings and said manifold; and a removable casing surrounding said element and serving to clamp its edges to said housings and manifold, said casing having filtrate-receiving recesses in communication with the filtrate discharge ports of said manifold.

20. In a filter head, the combination of spaced end housings one having a feed and the other a return connection for fluid to be treated; a manifold extending between said connections and provided with filtrate discharge ports; a curved filtering element overlying at its edges said end housings and said manifold; a removable casing surrounding said element and serving to clamp its edges to said housings and manifold, said casing having filtrate-receiving recesses in communication with the filtrate-discharge ports of said manifold; a rotatable drum having a periphery practically coextensive with and in close proximity to the internal surface of said filtering element; and means for rotating said drum.

21. In a filter head, the combination of spaced end housings one having a feed and the other a return connection for fluid to be treated; a manifold extending between said connections and provided with filtrate discharge ports; a curved filtering element overlying at its edges said end housings and said manifold; a removable casing surrounding said element and serving to clamp its edges to said housings and manifold, said casing having filtrate-receiving recesses in communication with the filtrate discharge ports of said manifold; a rotatable drum having a serrated periphery practically coextensive with and in close proximity to the internal surface of said filtering element; and means for rotating said drum.

22. In a filter, the combination of a casing, a filtering element mounted therein, an inlet and a discharge connection for circulating fluid to be treated through said casing and across the surface of said filtering element; and means serving to confine the liquid flow between said inlet and discharge connections to a relatively thin film following the surface of said filter element.

23. In a filter, the combination of a casing, a substantially cylindrical filter element mounted therein, an inlet connected to the interior of said cylindrical filtering element at one end thereof, a discharge connected to the interior of said filtering element at the opposite end thereof; and an imperforate deflecting element mounted within said filtering element between said inlet and discharge and serving to confine the flow of material between said inlet and discharge to a relatively thin film following the surface of said filter element.

24. The process of treating liquids which consists in mixing the liquid with finely divided solid absorptive reagent, allowing the reagent to absorb from the liquid all matter for which it has an affinity and then filtering off the major portion of the liquid while holding all the reagent with its absorbed matter in suspension in the remainder of the liquid, by rapid flow of said remainder adjacent the surface of the filtering element.

25. That step in processes for treating liquids with finely divided carbon which consists in separating the carbon from the liquid by rapid filtration under pressure, while preventing the deposition of the carbon in a filter cake by the scouring action of a rapidly moving stream of mixed liquid and carbon.

Signed at New York in the county of New York and State of New York this 12th day of April A. D. 1920.

CHARLES D. MORTON.